(12) United States Patent
Suontama

(10) Patent No.: US 8,878,999 B2
(45) Date of Patent: Nov. 4, 2014

(54) DETECTION OF GRAPHICS ADDED TO A VIDEO SIGNAL

(75) Inventor: Vesa Suontama, Espoo (FI)

(73) Assignee: Supponor Oy, Ristiina (FI)

( * ) Notice: Subject to any disclaimer, the term of this patent is extended or adjusted under 35 U.S.C. 154(b) by 0 days.

(21) Appl. No.: 14/009,513

(22) PCT Filed: Apr. 18, 2011

(86) PCT No.: PCT/FI2011/050350
§ 371 (c)(1),
(2), (4) Date: Oct. 15, 2013

(87) PCT Pub. No.: WO2012/143596
PCT Pub. Date: Oct. 26, 2012

(65) Prior Publication Data
US 2014/0036093 A1 Feb. 6, 2014

(51) Int. Cl.
H04N 9/76 (2006.01)
H04N 5/50 (2006.01)
H04N 21/81 (2011.01)
H04N 17/00 (2006.01)
H04N 21/234 (2011.01)
G06K 9/00 (2006.01)
H04N 5/45 (2011.01)
H04N 21/44 (2011.01)

(52) U.S. Cl.
CPC ........... *H04N 17/00* (2013.01); *H04N 21/8153* (2013.01); *H04N 21/23418* (2013.01); *G06K 9/00711* (2013.01); *H04N 5/45* (2013.01); *H04N 21/44008* (2013.01)
USPC ............ 348/600; 348/465; 348/569; 382/190

(58) Field of Classification Search
CPC .................... H04N 7/00; H04N 11/00; H04N 7/035–7/0357; H04N 7/0882–7/0888; G06K 9/00456; G06K 9/00483
USPC ................... 348/465, 468; 382/176, 190, 182
See application file for complete search history.

(56) References Cited

U.S. PATENT DOCUMENTS 6,906,743 B1   6/2005  Maurer
7,339,992 B2 *  3/2008  Chang et al. ............. 375/240.25

(Continued)

FOREIGN PATENT DOCUMENTS

WO       2009074710 A1    6/2009

OTHER PUBLICATIONS

Zhang, D., et al., "General and Domain-Specific Techniques for Detecting and Recognizing Superimposed Text in Video." Proc. IEEE Int. Conf. on Image Processing (ICIP 2002), Sep. 22-25, 2002, Rochester, NY. pp. I-593-I-596. IEEE, Piscataway, NJ.

(Continued)

*Primary Examiner* — Michael Lee
(74) *Attorney, Agent, or Firm* — Coats & Bennett, P.L.L.C.

(57) ABSTRACT

The invention allows detecting which graphics, if any, have been added to the video signal at any given time by utilizing only the various signals provided by prior art hardware. A first video signal, graphics signal(s), and a second video signal are received. It is then determined which graphics, if any, are present in a given frame of the received second video signal based on comparing actual values of pixels of the received second video signal and calculated values of pixels derived from the first video signal, and the graphics signal(s), and the combination of graphics signal(s) which produces the best match is searched for.

15 Claims, 2 Drawing Sheets

(56) References Cited

U.S. PATENT DOCUMENTS

| | | |
|---|---|---|
| 2005/0273694 A1 | 12/2005 | Chouraqui et al. |
| 2007/0064014 A1 | 3/2007 | Piek |
| 2008/0143880 A1* | 6/2008 | Jung et al. ............ 348/571 |
| 2010/0220930 A1* | 9/2010 | Sun et al. ............ 382/190 |

OTHER PUBLICATIONS

Li, H., et al., "Automatic Text Detection and Tracking in Digital Video." IEEE Transactions on Image Processing, vol. 9, No. 1, Jan. 2000. pp. 147-156. IEEE, Piscataway, NJ.

\* cited by examiner

DETECTION OF GRAPHICS ADDED TO A VIDEO SIGNAL

BACKGROUND OF THE INVENTION

1. Field of the Invention

The invention relates to video signal processing. In particular, the invention relates to methods, computer programs and apparatuses for detecting the presence of additional graphics in a video signal.

2. Description of the Related Art

Today, it is common for television broadcasts to add information in the form of graphics to the video signal(s) being shot by the television camera(s). For example, television broadcasts of sports events are typically produced so that additional information in the form of graphics is provided to the viewer to help him/her to understand the game. This additional information is added on top of the video images, and the additional information may be e.g. a game clock, a logo of the broadcasting television station (typically added to the upper right corner), a player's name, etc.

In a broadcast environment, the additional graphics are typically formed by a graphics system and mixed by a vision mixer. A vision mixer (also called video switcher, video mixer or production switcher) is a device that mixes different video sources to output feeds. Typically a vision mixer can be found in a professional television production environment such as a television studio, a cable broadcast facility, a commercial production facility, a remote truck/outside broadcast van (OB van), or a linear video editing bay. E.g. a vision engineer located in an outside broadcast van is listening to instructions from a director of a sports broadcast and selecting the camera to be shown. The director also instructs the vision engineer to turn certain graphics on or off in order to produce an aesthetic experience for the viewer and/or to make the program more informative to the viewer. For example, the game clock is typically hidden during replay after a goal, and the name of a player is displayed together with the image of the player.

The vision mixer gets different inputs, such as camera inputs, recorder inputs, and feeds from a graphics system. These inputs to the vision mixer are typically independent of the director's instructions. For example, on one of the inputs, the clock is on all the time.

Typically, graphics to be added on top of the video images is partly transparent, and the graphics is arranged on top of the video images by means of two auxiliary signals: a graphics signal and a mask signal. The graphics signal includes the graphics to be added (such as a logo of a broadcasting station, the name of a player in a sports broadcast, or a game clock), and the mask signal (also known as a key signal) defines the transparency (also known as alpha) of pixels of its associated graphics signal. A mask signal is typically a monochrome signal, where completely black areas correspond to completely transparent, and completely white areas correspond to opaque. Areas between completely black and completely white correspond to various degrees (e.g. in percentages) of transparency. Typically but not always, each graphics signal/mask signal—pair corresponds to a single graphics t, and there may be several of these graphics signal/mask signal—pairs per one video signal. At any given time, one or more of these graphics signal/mask signal—pairs may be mixed on or off the video signal (e.g. by the vision engineer using the vision mixer), so that the corresponding graphics will or will not be visible as required. In the art, the video signal without the added graphics is often called a clean feed, and the video signal with the added graphics is called a dirty feed.

Typically, a prior art vision mixer outputs only the clean feed and the dirty feed, and at least the dirty feed is then forwarded in the broadcast signal transmission chain until it finally reaches the viewers. That is, prior art vision mixers are not configured to output any specific information about which combination of the input graphics signals is on (i.e. mixed into the clean feed to create the dirty feed) at any given time. The presence of transparency (i.e. the mask signals) means that one cannot just compare the clean feed and the dirty feed pixel-by-pixel to try to determine the added graphics based on the differences, since it is not trivial to determine the color and the transparency of a pixel in such a case.

Yet, there are situations in which it would be useful to be able to detect which graphics are added to a video signal, such as a television broadcast signal at any given time. For example, the present applicant's earlier patent application WO 2009/074710 describes a method for modifying the content of a television image by inserting substitutive content into specific areas of a television image. Information about which graphics are added to the television image at any given time facilitates such insertion of the substitutive content.

As described above, to obtain this information about which graphics are added to the video signal at any given time, in prior art one has had to e.g. modify conventional vision mixers so that they can provide this information. However, this is a major disadvantage since it requires the owner of the vision mixer to do this, and modifications to expensive existing systems are risky.

Therefore, an object of the present invention is to alleviate the problems described above and to introduce a solution that allows detecting which graphics are added to the video signal at any given time by utilizing only the various signals provided by e.g. a vision mixer and/or a graphics system, i.e. without requiring any modifications to existing conventional hardware.

SUMMARY OF THE INVENTION

A first aspect of the present invention is a method of detecting the presence of additional graphics in a video signal. The following are received: a first video signal, at least one graphics signal, and a second video signal comprising said first video signal mixed at least periodically with the at least one graphics signal. Calculated values of pixels are derived from a frame of the received first video signal and a corresponding frame of the received at least one graphics signal. The calculated values are compared with actual values of pixels of a corresponding frame of the received second video signal. A presence status of the at least one graphics signal in the frame of the received second video signal is determined based on the performed comparison.

A second aspect of the present invention is an apparatus for detecting the presence of additional graphics in a video signal. The apparatus comprises a receiver configured to receive a first video signal, at least one graphics signal, and a second video signal comprising said first video signal mixed at least periodically with the at least one graphics signal. The apparatus further comprises a calculator configured to derive calculated values of pixels from a frame of the received first video signal and a corresponding frame of the received at least one graphics signal. The apparatus further comprises a comparator configured to compare the calculated values with actual values of pixels of a corresponding frame of the received second video signal. The apparatus further comprises a selector configured to determine a presence status of the at least one graphics signal in the frame of the received second video signal based on the performed comparison.

A third aspect of the present invention is a computer program comprising code adapted to cause the following when executed on a data-processing system:

receiving a first video signal, at least one graphics signal, and a second video signal comprising said first video signal mixed at least periodically with the at least one graphics signal;

deriving calculated values of pixels from a frame of the received first video signal and a corresponding frame of the received at least one graphics signal;

comparing the calculated values with actual values of pixels of a corresponding frame of the received second video signal; and determining a presence status of the at least one graphics signal in the frame of the received second video signal based on the performed comparison.

A fourth aspect of the present invention is an apparatus for detecting the presence of additional graphics in a video signal. The apparatus comprises a receiving means for receiving a first video signal, at least one graphics signal, and a second video signal comprising said first video signal mixed at least periodically with the at least one graphics signal. The apparatus further comprises a calculating means for deriving calculated values of pixels from a frame of the received first video signal and a corresponding frame of the received at least one graphics signal. The apparatus further comprises a comparing means for comparing the calculated values with actual values of pixels of a corresponding frame of the received second video signal. The apparatus further comprises a selecting means for determining a presence status of the at least one graphics signal in the frame of the received second video signal based on the performed comparison.

In an embodiment of the invention, the receiving further comprises receiving transparency information indicating transparency of at least a portion of a frame of an associated graphics signal, and the deriving further comprises deriving the calculated values of pixels from the received transparency information in addition to the frame of the received first video signal and the corresponding frame of the received at least one graphics signal.

In an embodiment of the invention, the deriving further comprises deriving the calculated values for a number of presence combinations of the at least one graphics signal.

In an embodiment of the invention, the determination of the presence status is performed by selecting—as indicative of the presence status of the at least one graphics signal in the frame of the received second video signal—the presence combination the calculated values of which best match with the compared actual values according to a statistical criterion.

In an embodiment of the invention, an effective result of used graphics information and/or associated resulting transparency information is produced, based on the determined presence status.

In an embodiment of the invention, the produced used graphics information and its associated used transparency information are applied to one or more additional incoming video signals to produce one or more additional output video signals.

In an embodiment of the invention, the computer program of the third aspect of the present invention is stored on a computer-readable medium. In an embodiment of the invention, the computer-readable medium only includes a non-transitory medium.

It is to be understood that the aspects and embodiments of the invention described above may be used in any combination with each other. Several of the aspects and embodiments may be combined together to form a further embodiment of the invention. A method, an apparatus, or a computer program which is an aspect of the invention may comprise at least one of the embodiments of the invention described above.

The invention allows detecting which graphics are added to the video signal at any given time by utilizing only the various signals readily provided by e.g. a vision mixer and/or a graphics system, i.e. without requiring any modifications to existing conventional hardware. This way, the detection of the graphics can be performed in a significantly more cost-effective and less time- and effort-consuming manner. Furthermore, the invention allows detecting the presence of the added graphics even when there are rounding errors or noise present.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

In the following, the invention is described with examples related to television broadcasting. However, it is to be understood that the present invention is not limited to such implementations. Instead, the present invention can as well be used in any applications in which a first video signal, graphics signal(s), and a second video signal are available. The first video signal may be e.g. a clean video signal or a clean feed, and the second video signal may be e.g. a dirty video signal or a dirty feed. The first and/or second video signal may be a live signal being shot with e.g. a television camera, or the first and/or second video signal may be e.g. a previously recorded video signal stored e.g. in a file or several files.

Furthermore, herein the term "signal" is used as a logical concept. I.e. each signal is not necessarily transferred in a separate physical channel. Rather, several signals may be transferred in a common physical channel shared by the signals.

Figure 1:
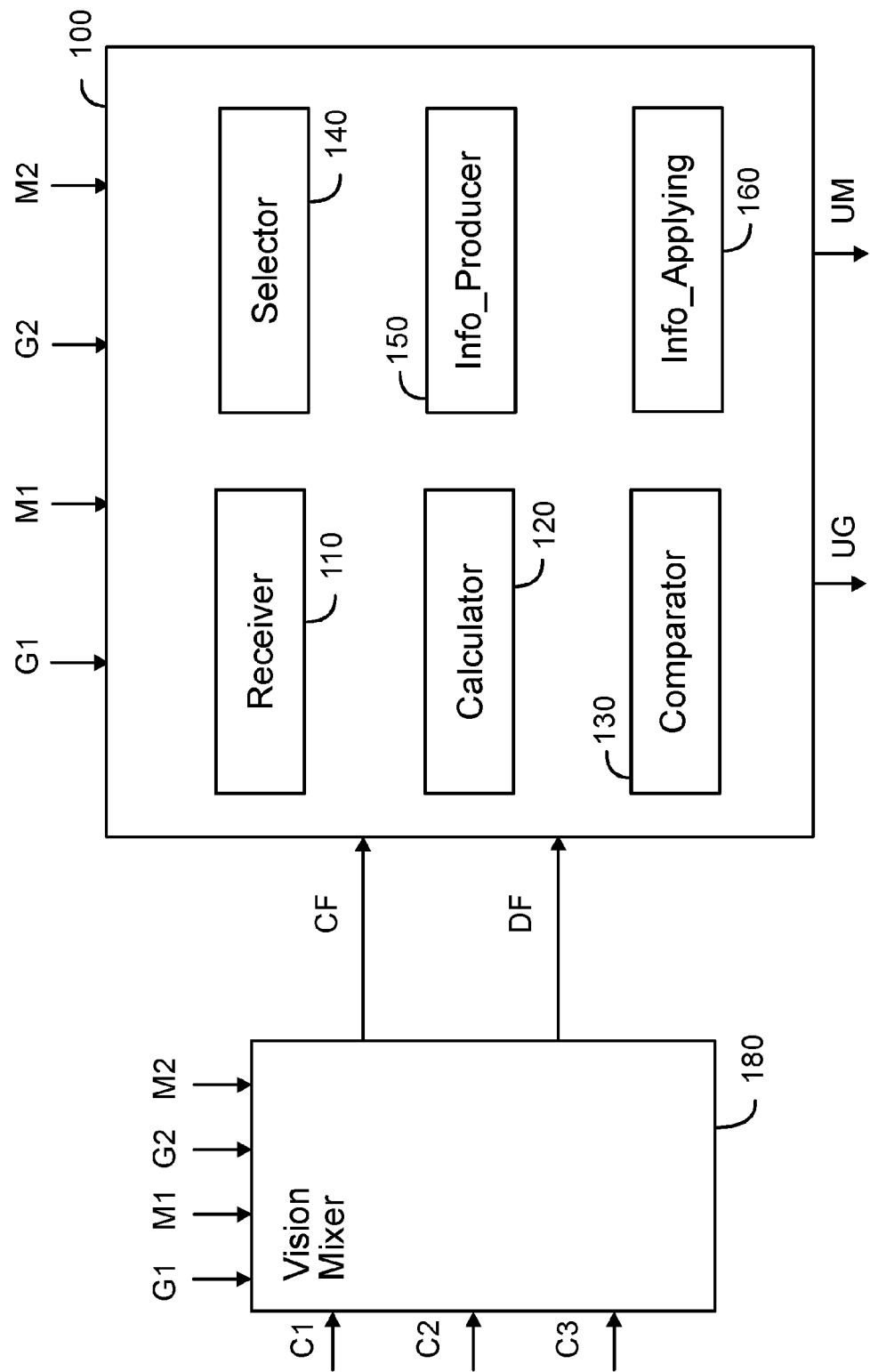
FIG. 1 is a block diagram illustrating an apparatus according to an embodiment of the invention as deployed in connection with a prior art vision mixer.

FIG. 1 is a block diagram illustrating an apparatus 100 according to an embodiment of the invention as deployed in connection with a prior art vision mixer 180.

The vision mixer 180 is a device that mixes different video sources to output feeds. Typically a vision mixer can be found in a professional television production environment such as a television studio, a cable broadcast facility, a commercial production facility, a remote truck/outside broadcast van, or a linear video editing bay.

As depicted in FIG. 1, inputs of the vision mixer 180 include a first graphics signal G1 and a second graphics signal G2. The first graphics signal G1 may comprise first graphics or graphical element(s) (e.g. a television station logo), and the second graphics signal G2 may comprise second graphics or graphical element(s) (e.g. a game clock). The inputs of the vision mixer 180 may further include a first mask signal M1 and a second mask signal M2. The first mask signal M1 may comprise transparency information that indicates transparency of at least a portion of a frame of its associated graphics signal G1, such as e.g. pixel-specific transparency values (also known as alpha values) for the first graphics signal G1, and the second mask signal M2 may comprise transparency information that indicates transparency of at least a portion of a frame of its associated graphics signal G2, such as e.g. pixel-specific transparency values for the second graphics signal G2. The transparency values may vary e.g. from 0 to 1, with 0 corresponding to e.g. totally transparent, 1 corresponding to e.g. totally opaque, and values between 0 and 1 corresponding to e.g. various degrees of transparency. In the art, the term "mask" is also known as "key".

The inputs of the vision mixer 180 may further include a first camera signal C1, a second camera signal C2, and a third camera signal C3, each being fed from e.g. a respective television camera (not illustrated in FIG. 1).

At any given time, one of the camera signals C1, C2, C3 is selected as active (by e.g. a vision engineer operating the vision mixer 180), and one or more of the graphics signals (or graphics or graphical elements in the graphics signals) may be added/mixed (again by e.g. the vision engineer operating the vision mixer 180) into the selected camera signal with the transparency of each added graphics signal/graphics/graphical element being defined by its respective transparency information or transparency values. Accordingly, each graphics/graphical element may be opaque, partially transparent, or wholly transparent. In the following, the camera signal selected as active without any added graphics/graphical element will be referred to as a first or "clean" video signal (also known as clean feed), and the camera signal selected as active with at least periodically added graphics/graphical element(s) will be referred to as a second or "dirty" video signal (also known as dirty feed). The clean video signal CF and the dirty video signal DF are outputs from the vision mixer 180.

It is to be understood that the amount of the various signals depicted in FIG. 1 is provided as an example only, and that any number of signals may be used.

Conventionally, at least the dirty video signal DF and optionally the clean video signal CF would next be forwarded in the broadcast signal transmission chain in order to transmit the dirty video signal DF as a television broadcast signal to the viewers.

However, the present invention introduces the apparatus 100 for detecting which of the graphics/graphical elements are added to the dirty video signal DF at a given time, and the clean video signal CF and the dirty video signal DF are therefore first input into this apparatus 100.

In the non-limiting example of FIG. 1, the inputs of the apparatus 100 further include the first graphics signal G1, the second graphics signal G2, the first mask signal M1 (carrying first transparency information), and the second mask signal M2 (carrying second transparency information). The apparatus 100 may obtain the first graphics signal G1, the second graphics signal G2, the first mask signal M1, and the second mask signal M2 e.g. from a conventional graphics system (not illustrated in FIG. 1) arranged in connection with the vision mixer 180 in a broadcasting environment.

As used herein, the term "graphics system" refers to a prior art graphics machine or entity that generates graphics signals and mask signals and provides them to a vision mixer.

In other words, the apparatus 100 comprises a receiver 110 that is configured to receive a first or clean video signal CF, graphics signals G1 and G2, and a second or dirty video signal DF that comprises the first video signal G1 mixed at least periodically with the graphics signals G1 and/or G2. In an embodiment of the invention, the receiver 110 may be further configured to receive transparency information (comprised e.g. the mask signals M1, M2) indicating transparency of at least a portion of a frame of an associated graphics signal.

As is known in the art, the mixing of a clean video signal and a graphics signal may be expressed with the following Equation 1 (calculated e.g. separately for each pixel and each color component (e.g. in RGB space as used herein as an example, but any other color space such as YUV space can be used instead, since conversion between color spaces is trivial for those skilled in the art)):

$$DF_1 = (1-M_1)*CF + M_1*G_1 \quad \text{(Eq. 1)}$$

In the Equation 1, the $M_1$ represents the transparency value (e.g. from 0 to 1) of the first added graphics signal, $G_1$ represents the intensity of the first added graphics signal, CF represents the intensity of the clean video signal, and $DF_1$ represents the intensity of the dirty video signal after mixing the first added graphics signal into it.

Herein, the intensity of a pixel consists of intensities or intensity measures of the color components of the pixel.

The equation examples below are for a linear RGB color system. As is known to those skilled in the art, equations for other color systems may also be derived.

If there is also a second graphics signal to be added, the following Equation 2 represent the situation after adding the first and the second graphics signals:

$$DF_2 = (1-M_2)*DF_1 + M_2*G_2 \quad \text{(Eq. 2)}$$

In the Equation 2, the $M_2$ represents the transparency value (from 0 to 1) of the second added graphics signal, $G_2$ represents the intensity of the second added graphics signal, $DF_1$ represents the intensity of the dirty video signal after mixing the first added graphics signal into it, and $DF_2$ represents the intensity of the dirty video signal after mixing the second added graphics signal into it.

Combining Equation 1 and Equation 2 produces the following Equation 3:

$$DF_2 = (1-M_2)*((1-M_1)*CF + M_1*G_1) + M_2*G_2 \quad \text{(Eq. 3)}$$

Generalizing this for n inputs produces the following Equation 4:

$$DF_N = (1-M_N)*(DF_{N-1}) + M_N*G_N \quad \text{(Eq. 4)}$$

The problem of the present invention, i.e. finding the added graphics, can be transformed to an equation so that we try to find multipliers or coefficients ($K_N$) for each of the mask values. Each coefficient K can have as its value e.g. either 0 or 1, of which e.g. 0 indicates that the corresponding graphical element is not present, and e.g. 1 indicates that it is present.

For the example of FIG. 1 of two graphics signals and two mask signals, this produces the following Equation 5:

$$DF_2 = (1-K_2*M_2)*((1-K_1*M_1)*CF + K_1*M_1*G_1) + K_2*M_2*G_2 \quad \text{(Eq. 5)}$$

Equation 5 can be obtained from Equation 3 by substituting $M_N$ with $K_N*M_N$.

Obviously, Equation 5 can be extended to a general case, but for the purposes of facilitating the understanding of the invention, the case of two graphics signals and two mask signals will be used herein to illustrate the invention. Similarly, other means of finding which graphics are on the air can be used.

The apparatus 100 further comprises a calculator 120 that is configured to derive calculated values from a frame of the received first video signal CF, from a corresponding frame of the received at least one graphics signal G1, G2, and optionally from the received transparency information M1, M2. Optionally, the calculator 120 may be further configured to derive the calculated values for a number of presence combinations of the at least one graphics signal G1, G2. Herein, the term "presence combinations" refers to the various combinations of the graphics signal(s) being present/on (i.e. mixed-in) or absent/off (i.e. not mixed-in) in a given frame of the second video signal DF. For example, in the case of two graphics signals G1, G2, presence combinations may include following combinations:

0—both G1 and G2 are off (i.e. Dirty Feed DF is the same as Clean Feed CF);

1—first graphics signal G1 is on and second graphics signal G2 is off;

2—first graphics signal G1 is off and second graphics signal G2 is on;

12—both graphics signals G1 and G2 are on, and the second one G2 is drawn after the first one G1; etc.

The apparatus 100 further comprises a comparator 130 that is configured to compare the calculated values with actual values of a corresponding frame of the received second video signal DF.

The apparatus 100 further comprises a selector 140 that is configured to determine a presence status of the at least one graphics signal G1, G2 in the frame of the received second video signal DF based on the performed comparison. Herein, the term "presence status" of a graphics signal refers to whether the graphics signal in question is present in a given frame of the second video signal DF or not. In an embodiment, the selector 140 may be configured to perform the determination of the presence status by selecting the presence combination the calculated values of which best match with the compared actual values according to a statistical criterion, as being indicative of the presence status of the at least one graphics signal in the frame of the received second video signal.

The apparatus 100 may further comprise an information producer 150 that is configured to produce at least one of used graphics information and associated used transparency information, wherein the used graphics information indicates the determined presence status.

The apparatus 100 may further comprise an information applying unit 160 that is configured to apply the produced used graphics information and its associated used transparency information to one or more additional incoming video signals to produce one or more additional output video signals.

In other words, the calculator 120, and the comparator 130 may be used to try out all the different combinations of Ks (i.e. 0,0; 1,0; 0,1; 1,1 in the case of two graphics signals and two mask signals) for the whole image in order to find the combination of Ks that best fits the Equation 5. Then, when the best fitting combination of Ks is found, the selector 140 may be used to determine from the best fitting combination of Ks which graphical elements are present.

As a result, the apparatus 100 may output a used graphics signal UG which is the effective combination of graphics signals G1, G2 that is on at the given moment. The apparatus 100 may further output a used mask signal UM which is the effective combination of mask signals that is on at the given moment.

In an embodiment, the order of graphics inputs is fixed so that the order of inputs is the same order as the order in which graphics are applied in the vision mixer (and in Equations 1-5).

Figure 2:
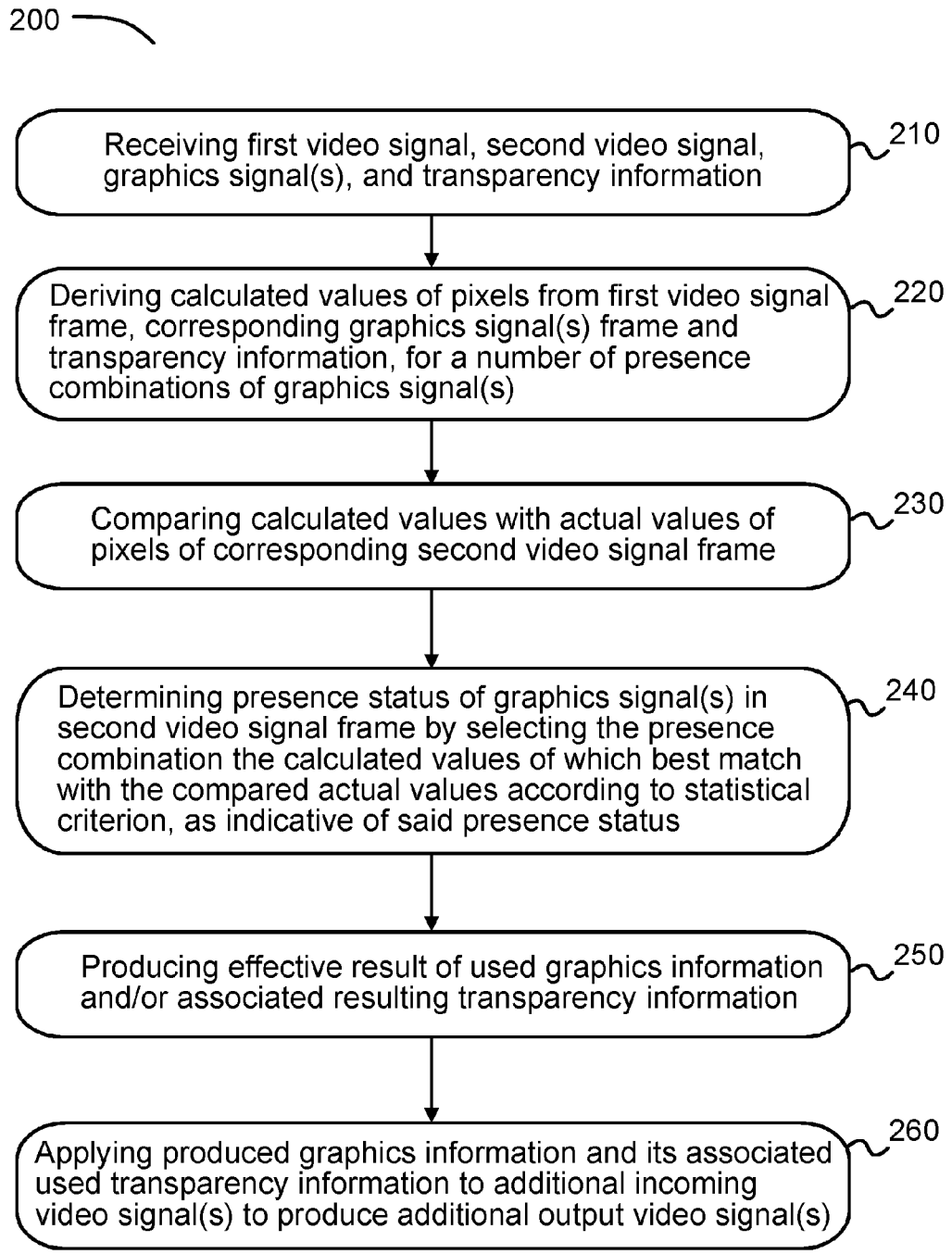
FIG. 2 is a flow diagram illustrating a method according to an embodiment of the invention.

FIG. 2 is a flow diagram illustrating a method 200 of detecting the presence of additional graphics or graphical elements in a video signal according to an embodiment of the invention.

At step 210, the following are received: a first video signal, at least one graphics signal, a second video signal comprising said first video signal mixed at least periodically with the at least one graphics signal, and optionally transparency information that indicates transparency of at least a portion of a frame of an associated graphics signal.

At step 220, calculated values of pixels are derived from a frame of the received first video signal, from a corresponding frame of the received at least one graphics signal, and optionally from the received transparency information. Optionally, the calculated values are derived for a number of presence combinations of the at least one graphics signal.

At step 230, the calculated values are compared with actual values of pixels of a corresponding frame of the received second video signal.

At step 240, a presence status of the at least one graphics signal in the frame of the received second video signal is determined based on the performed comparison. The determination of the presence status may be performed e.g. by selecting—as indicative of the presence status of the at least one graphics signal in the frame of the received second video signal—the presence combination the calculated values of which best match with the compared actual values according to a statistical criterion.

At step 250, used graphics information and/or associated used transparency information are produced, wherein the used graphics information indicates the determined presence status.

At step 260, the produced used graphics information and its associated used transparency information are applied to one or more additional incoming video signals to produce one or more additional output video signals.

As discussed above, the vision mixer 180 can have some of the graphics channels or signals configured as "on", and some of them as "off". In order to determine, which ones were on/off, some or all possible combinations of the on/off-setting of those graphics channels may be dealt through.

When the combinations are dealt through, it is assumed that the order of the graphics channels that are overlaid on top of the active camera signal, is always predetermined and fixed, and it is also assumed that this order is known (for the captured inputs/outputs of the vision mixer 180, it is assumed that it is known which signal would be overlaid first, second, etc.).

For example, if the vision mixer 180 has two graphics channels, the following combinations are inspected:

0—nothing is on (Dirty Feed is the same as Clean Feed);

1—first graphics signal G1 is on;

2—second graphics signal G2 is on;

12—both graphics signals G1 and G2 are on, and the second one G2 is drawn on top of the first one G1;

21—this combination does not need to be checked, as the order of the graphics channels is always the same 123 . . . , etc.

We emulate the vision mixer's 180 work of overlaying of the graphics signals by using the following equation examples for every pixel of a frame (it is to be noted that these equations are provided as examples only and that the invention is not limited to these equation examples. Instead, other mixing equations may be used):

$$Alpha = (Mask - 16)/220$$

$$Result = (1 - Alpha)*Background + Alpha*Graphics,$$
assuming $0 \leq Alpha \leq 1$ where:

Mask: the Y value of graphics mask pixel;

Background: Y, U, V values of the pixel of the original video frame; and

Graphics: Y, U, V values of the pixel of the graphics frame.

Next, we compare the overlay results of all the combinations of the graphics, and choose the one that gives the results that are closest to the Dirty Feed signal. In order to determine how close a resulting signal is to the Dirty Feed, we examine the difference between two frames (DBTF), that is defined as a sum of all differences between corresponding pixels of the two frames.

Differences between the pixel (Y1, U1, V1) and the pixel (Y2, U2, V2) is Euclidean metric, i.e. it is the length of the vector (Y2−Y1, U2−U1, V2−V1), i.e. it is sqrt (sqr(Y2−Y1)+sqr(U2−U1)+sqr(V2−V1)).

For performance reasons we may use a simplified formula: abs(Y2−Y1)+abs(U2−U1)+abs(V2−V1) to determine the length.

So, first DBTF is calculated for the Clean Feed and Dirty Feed frames (Delta0=DF−CF). If Delta0 equals 0, then no graphics signals are on. Otherwise, DBTFs are calculated for each combination of graphics signals. That results in a sequence of Delta0, Delta1, ..., DeltaM, where M=2^N−1, where N is a number of graphics signals. For example, for 3 graphics signals we get this sequence of combinations: 0, 1, 2, 3, 12, 13, 23, 123.

After determining which graphics signals were "on" in the vision mixer 180, the present invention may produce, for every frame captured from the vision mixer 180 inputs/outputs, a used graphics video frame which consists of a mix of all active graphics signals put on top of a black frame. The mixing equations for producing the used graphics feed are the same that are used for emulating the work of the vision mixer 180. Also, for every frame captured from the vision mixer 180 inputs/outputs, the present invention may produce a used mask video frame which represents a combination of all the masks of active graphics signals, and it can be used to overlay the used graphics frame on top of Clean Feed. In order to determine the pixel of the used masks, the present invention may use the following equation:

Mask=(DirtyFeed−CleanFeed)/(UsedGraphics−CleanFeed)

In case UsedGraphics equals CleanFeed, the pixel in question is ignored.

The equations shown above used to emulate the work of the vision mixer may differ from the actual equations used by an actual vision mixer device. That is why we need to search for a closest match of our results to the Dirty Feed produced by the vision mixer 180 and not the exact match.

Moreover, the inventors have discovered that sometimes a vision mixer may modify some of the regions in the image (e.g. it adds a white line on one of the borders of the image), so the Dirty Feed is not just a product of a graphics overlay process, but also some over interference may happen inside a vision mixer. An advantage of the invention is that the algorithm described above can handle that.

Furthermore, sometimes a vision mixer may use transition effects to overlay the graphics signals. That adds even more interference in the resulting Dirty Feed, in addition to simply overlaying the graphics signals. Yet, the invention allows detecting the graphics that was on/off in Vision Mixer, even in the presence of some of such transition effects (e.g., those ones that alter the pixels of auxiliary graphics mask).

Possible Optimizations:

1. While DeltaX, that is being calculated, is already greater than the current minimal Delta, we can then stop its further calculation, and drop the combination from consideration.

2. Historical data can be used. If some feeds were frequently (or always) turned on (e.g. a game clock), then it is very likely that some of them are turned on for further frames of the video, and this assumption can be taken into consideration for choosing the order of combinations to consider.

3. If the order of the overlay of graphics is not fixed in the vision mixer 180, we can still handle that case by increasing the list of combinations we check, so, for two graphics signals, instead of checking 0, 1, 2, 12, we would check 0, 1, 2, 12, 21.

4. We could determine the combination of the graphics signals even if the vision mixer 180 uses complex transition effects that alter the pixels of the graphics signal that is to be overlaid (e.g. when graphics is sliding from the top of the screen to its target place). In such a case, we could iterate through all possible combinations of the transition effects, in addition to all possible combinations of the graphics signals.

The exemplary embodiments can include, for example, any suitable servers, workstations, PCs, laptop computers, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method of detecting the presence of additional graphics in a video signal, the method comprising:

receiving a first video signal, at least one graphics signal, and a second video signal comprising said first video signal mixed at least periodically with the at least one graphics signal;

deriving calculated values of pixels from a frame of the received first video signal and a corresponding frame of the received at least one graphics signal;

comparing the calculated values with actual values of pixels of a corresponding frame of the received second video signal; and determining a presence status of the at least one graphics signal in the frame of the received second video signal based on the performed comparison;

wherein receiving a first video signal, at least one graphics signal, and a second video signal comprising said first video signal mixed at least periodically with the at least one graphics signal further comprises receiving transparency information indicating transparency of at least a portion of a frame of an associated graphics signal, and said deriving calculated values of pixels from a frame of the received first video signal and a corresponding frame of the received at least one graphics signal further comprises deriving the calculated values from the received transparency information in addition to the frame of the received first video signal and the corresponding frame of the received at least one graphics signal.

2. The method according to claim 1, wherein deriving calculated values of pixels from a frame of the received first video signal and a corresponding frame of the received at least one graphics signal further comprises deriving the calculated values for a number of presence combinations of the at least one graphics signal.

3. The method according to claim 2, wherein determining a presence status of the at least one graphics signal in the frame of the received second video signal based on the performed comparison is performed by selecting the presence combination the calculated values of which best match with the compared actual values according to a statistical criterion, as indicative of said presence status of the at least one graphics signal in the frame of the received second video signal.

4. The method according to claim 1, further comprising producing an effective result of at least one of used graphics information and associated resulting transparency information, based on said determined presence status.

5. The method according to claim 4, further comprising applying the produced used graphics information and its associated used transparency information to one or more additional incoming video signals to produce one or more additional output video signals.

6. An apparatus for detecting the presence of additional graphics in a video signal, the apparatus comprising:

a receiver configured to receive a first video signal, at least one graphics signal, and a second video signal comprising said first video signal mixed at least periodically with the at least one graphics signal;

a calculator configured to derive calculated values of pixels from a frame of the received first video signal and a corresponding frame of the received at least one graphics signal;

a comparator configured to compare the calculated values with actual values of pixels of a corresponding frame of the received second video signal; and a selector configured to determine a presence status of the at least one graphics signal in the frame of the received second video signal based on the performed comparison;

wherein the receiver is further configured to receive transparency information indicating transparency of at least a portion of a frame of an associated graphics signal, and said calculator is further configured to derive the calculated values from the received transparency information in addition to the frame of the received first video signal and the corresponding frame of the received at least one graphics signal.

7. The apparatus according to claim 6, wherein the calculator is further configured to derive the calculated values for a number of presence combinations of the at least one graphics signal.

8. The apparatus according to claim 7, wherein the selector is configured to perform said determination of said presence status by selecting the presence combination the calculated values of which best match with the compared actual values according to a statistical criterion, as indicative of said presence status of the at least one graphics signal in the frame of the received second video signal.

9. The apparatus according to claim 6, further comprising an information producer configured to produce an effective result of at least one of used graphics information and associated resulting transparency information, based on said determined presence status.

10. The apparatus according to claim 9, further comprising an information applying unit configured to apply the produced used graphics information and its associated used transparency information to one or more additional incoming video signals to produce one or more additional output video signals.

11. A computer program product stored in a non-transitory computer readable medium for detecting additional graphics in a video signal, the computer program product comprising software instructions which, when run, causes a data-processing system to perform the following:
receiving a first video signal, at least one graphics signal, and a second video signal comprising said first video signal mixed at least periodically with the at least one graphics signal;
deriving calculated values of pixels from a frame of the received first video signal and a corresponding frame of the received at least one graphics signal;
comparing the calculated values with actual values of pixels of a corresponding frame of the received second video signal; and
determining a presence status of the at least one graphics signal in the frame of the received second video signal based on the performed comparison;
wherein said receiving a first video signal, at least one graphics signal, and a second video signal comprising said first video signal mixed at least periodically with the at least one graphics signal further comprises receiving transparency information indicating transparency of at least a portion of a frame of an associated graphics signal, and said deriving calculated values of pixels from a frame of the received first video signal and a corresponding frame of the received at least one graphics signal further comprises deriving the calculated values from the received transparency information in addition to the frame of the received first video signal and the corresponding frame of the received at least one graphics signal.

12. The computer program product according to claim 11, wherein said deriving calculated values of pixels from a frame of the received first video signal and a corresponding frame of the received at least one graphics signal further comprises deriving the calculated values for a number of presence combinations of the at least one graphics signal.

13. The computer program product according to claim 12, wherein said determining a presence status of the at least one graphics signal in the frame of the received second video signal based on the performed comparison is performed by selecting the presence combination the calculated values of which best match with the compared actual values according to a statistical criterion, as indicative of said presence status of the at least one graphics signal in the frame of the received second video signal.

14. The computer program product according to claim 11, wherein the computer program product further causes the data-processing system to produce an effective result of at least one of used graphics information and associated resulting transparency information, based on said determined presence status.

15. The computer program product according to claim 14, wherein the computer program product further causes the data-processing system to apply the produced used graphics information and its associated used transparency information to one or more additional incoming video signals to produce one or more additional output video signals.

* * * * *